United States Patent
Wiley et al.

(10) Patent No.: US 6,923,092 B1
(45) Date of Patent: Aug. 2, 2005

(54) CONTROL MECHANISM FOR A HYDRAULIC DEVICE

(75) Inventors: Thomas Wiley, Lovington, IL (US); Bryce E. Steenburg, Mattoon, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/652,759

(22) Filed: Aug. 29, 2003

(51) Int. Cl.$^7$ ............................................. B60K 17/00
(52) U.S. Cl. .................. 74/606 R; 74/473.1; 180/344; 180/367
(58) Field of Search ............................... 74/600, 606 R, 74/471 R, 473.1; 180/344, 347, 364, 374, 180/367

(56) References Cited

U.S. PATENT DOCUMENTS

| | | | |
|---|---|---|---|
| 3,525,266 A * | 8/1970 | Brooks et al. ................. | 74/481 |
| 4,128,017 A | 12/1978 | Clarke | |
| 4,248,331 A | 2/1981 | Behrens | |
| 4,310,082 A * | 1/1982 | Elmy et al. .................. | 192/218 |
| 4,698,048 A | 10/1987 | Rundle | |
| 4,883,137 A * | 11/1989 | Wanie et al. ............... | 180/6.34 |
| 5,022,477 A * | 6/1991 | Wanie ........................ | 180/6.34 |
| 5,040,649 A * | 8/1991 | Okada ..................... | 192/220.1 |
| 5,509,496 A * | 4/1996 | Erickson et al. ............ | 180/307 |
| 5,913,950 A * | 6/1999 | Matsufuji ................... | 74/730.1 |
| 6,454,032 B1 * | 9/2002 | Teal et al. .................. | 180/6.62 |
| 6,766,715 B1 * | 7/2004 | Wiley et al. ............... | 74/606 R |

* cited by examiner

Primary Examiner—Tisha Lewis
(74) Attorney, Agent, or Firm—Neal, Gerber & Eisenberg LLP

(57) ABSTRACT

A control mechanism for a transmission such as a hydrostatic transmission or transaxle which simplifies construction and enables the user to change the orientation of the transmission in a vehicle. A first linkage member is rotatably mounted on a support rod and has first and second oppositely extending arms mounted thereon. The arms of the first linkage member are attached to the vehicle drive control and the transmission control arm. A second linkage member is rotatably mounted on the first linkage member and also has two arms oppositely extending therefrom which are connected to a vehicle brake control and the transmission brake mechanism. This second arm of the second linkage member may be engaged to a return arm that is connected to a transmission brake arm by a spring device.

18 Claims, 7 Drawing Sheets

CONTROL MECHANISM FOR A HYDRAULIC DEVICE

BACKGROUND OF THE INVENTION

This invention relates generally to hydrostatic transmissions and, more particularly, to a return-to-neutral and brake assembly for use in connection with a hydrostatic transmission.

Hydrostatic transmissions ("HSTs"), including integrated hydrostatic transmissions ("IHTs"), are well known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the angular orientation of the swash plate affects the degree of axial movement of the pump pistons.

The movement of the pump pistons forces a hydraulic fluid through the porting to the motor pistons, which causes the motor pistons to be forced against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor to drive one or more axles of a riding lawn mower, small tractor, or the like.

It is also known to use external linkages to control the output of such a transmission or transaxle and to provide braking of the unit. Such linkages are generally connected to hand or foot controls on a vehicle.

SUMMARY OF THE INVENTION

This invention provides improved linkages between a vehicle hand or foot control and a brake, controls and a return-to-neutral mechanism for a hydraulic apparatus such as an integrated hydrostatic transmission.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
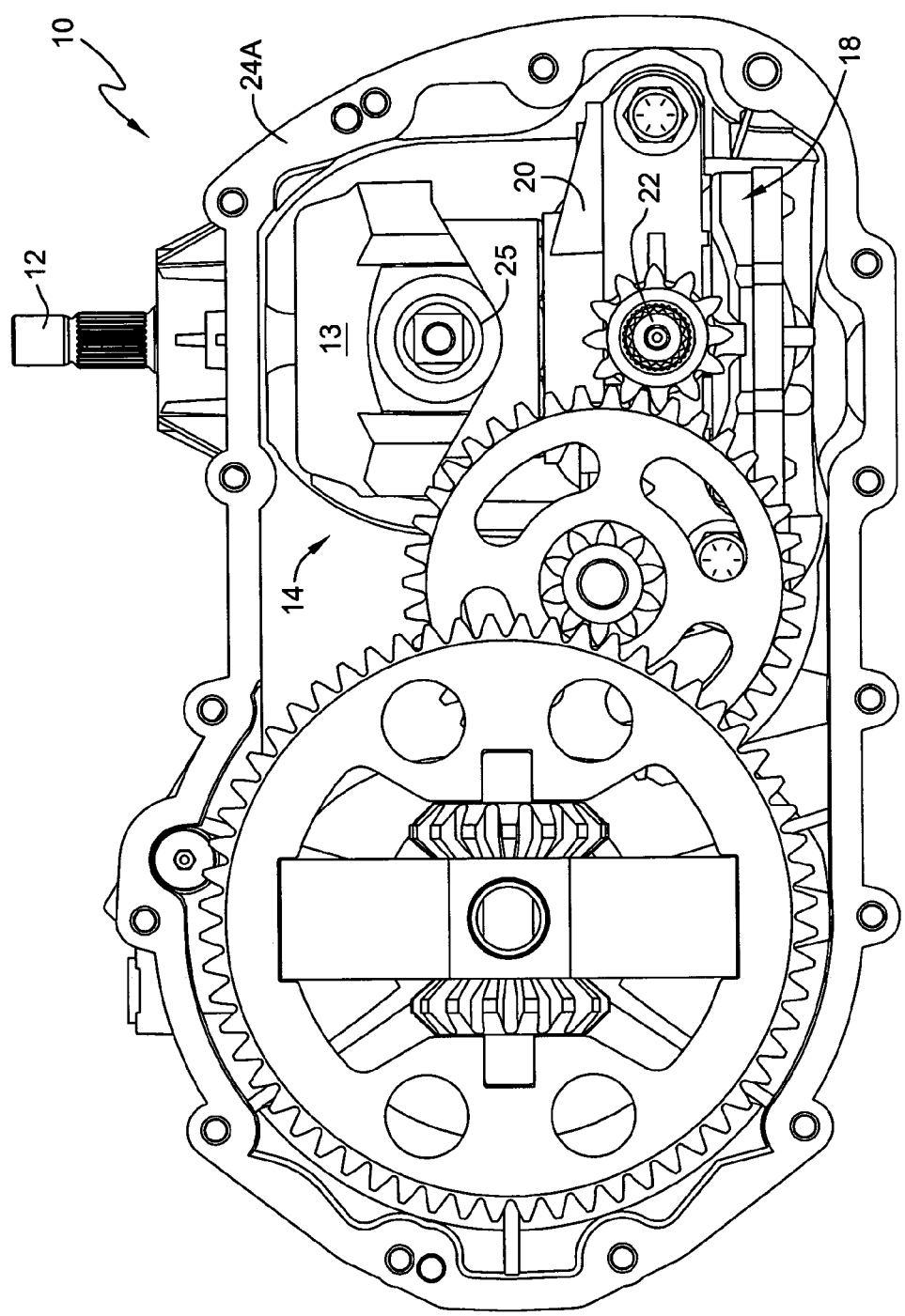
FIG. 1 illustrates an internal view of an exemplary embodiment of a hydrostatic transmission.

Turning now to the figures, wherein like reference numerals refer to like elements, there is illustrated in FIG. 1 the internal structure of an exemplary hydrostatic transmission in the form of an IHT 10. FIGS. 2 and 4–7 show an external view of this IHT 10. As will be understood by those of skill in the art, IHT 10 generally operates on the principle of an input shaft 12 rotatably driving a hydraulic pump 14 which, through the action of its pump pistons, pushes hydraulic fluid to a hydraulic motor (not shown) through porting formed in a center section 20 to cause the rotation of the hydraulic motor.

The rotation of the hydraulic motor causes the rotation of a motor shaft 22 which rotation is eventually transferred through a gearing system or the like to drive one axle shaft (in the case of a zero-turn hydrostatic transaxle) or a pair of axle shafts 26. A motive force from, for example, an engine (not shown) may be supplied directly to the input shaft 12 or indirectly by means of a pulley to drive hydraulic pump 14. For a more detailed description of the principles of operation of such a hydrostatic transmission and its related external controls, the reader is referred to U.S. Pat. Nos. 5,314,387; 5,613,409 and 6,253,637, all of which are incorporated herein by reference in their entirety.

The IHT 10 is provided with a housing or casing that, in the illustrated example, comprises a first side housing section 24A and a second side housing section 24B that are joined along a substantially vertical junction surface. Extending from the top of housing 24A is an input shaft 12. Meanwhile, axle shafts 26 in the illustrated example would extend from both the first side housing section 24A and second side housing section 24B. Thus, in the illustrated, exemplary IHT 10, the axis of axle shafts 26 would be generally perpendicular to the substantially vertical junction surface. Similarly, in the illustrated embodiment, the plane of the pump running surface of center section 20 is generally perpendicular to the substantially vertical junction surface while the plane of the motor running surface of center section 20 is generally parallel to the substantially vertical junction surface. The axis of motor shaft 22 would be generally parallel to the axis of axle shafts 26 and perpendicular to the axis of input shaft 12. It is to be understood, however, that this arrangement is merely illustrative and that the housing and/or IHT operating components can be otherwise arranged without departing from the scope of this invention.

For placing hydraulic pump 14 in fluid communication with the hydraulic motor, center section 20 includes hydraulic porting. The hydraulic porting is in further fluid communication with a source of makeup fluid, such as a fluid sump or a charge gallery. Generally, the hydraulic porting comprises a high pressure side through which fluid moves from hydraulic pump 14 to the hydraulic motor and a low pressure side through which fluid returns from the hydraulic motor to hydraulic pump 14. A filter assembly 18 may be positioned adjacent center section 20, intermediate the sump and the hydraulic porting, to minimize the introduction of impurities, such as metal shavings, into the hydraulic circuit when makeup fluid is drawn into the hydraulic circuit.

To adjust the amount of oil that is forced from hydraulic pump 14 to the hydraulic motor via the high pressure side hydraulic porting, IHT 10 includes a moveable swash plate 13 against which the pump pistons travel. The direction of rotation of hydraulic pump 14 is fixed by the rotation of input shaft 12 and, as such, hydraulic pump 14 is nearly always rotated in one direction. As will be understood by those of ordinary skill in the art, swash plate 13 may be moved to a variety of positions to vary the stroke of the pump pistons and the direction of rotation of the hydraulic motor. Generally, as the angular orientation of the swash plate 13 is varied in one direction from the neutral position the axial displacement or stroke of the pump pistons is varied, which then drives the hydraulic motor in a direction determined by the hydraulic porting at a speed that is related to the volume of the fluid displaced by the pump pistons taking into consideration the efficiency of the system. In the neutral position, swash plate 13 does not function to axially displace the pump pistons.

Rotation of the hydraulic motor results from the motor pistons moving against a thrust bearing under the influence of the hydraulic fluid. As the angular orientation of swash plate 13 is decreased to pass through the neutral position, the direction of rotation of the hydraulic motor is reversed and the speed of the hydraulic motor is again influenced by the volume of fluid displaced by the pump pistons. Since the speed of rotation of the hydraulic motor is dependent upon the amount of hydraulic fluid pumped thereinto by hydraulic pump 14 and the direction of rotation of the hydraulic motor is dependent upon the angular orientation of the swash plate 13, the angular orientation of swash plate 13 is seen to control the speed and direction of rotation of the hydraulic motor and, as will be apparent, the speed and direction of rotation of the axle shaft(s) 26.

For changing the angular orientation of swash plate 13, a trunnion arm 25 is rotatably supported in housing 24B of IHT 10. Rotation of trunnion arm 25 changes the angular orientation of swash plate 13 with respect to the pump pistons. To rotate trunnion arm 25 and, accordingly, move swash plate 13, a control arm 30 is coupled to trunnion arm 25.

In the embodiment depicted, brake mechanism 50 comprises a brake disk 46 mounted on motor output shaft 22. Brake disk 46 is actuated by means of brake arm 35 which is maintained in, and returned to its disengaged position by means of return spring 37 which is mounted between brake arm 35 and housing 24B.

The rotation of trunnion arm 25, and thus the position of swash plate 13 is controlled externally by means of control arm 30. An optional friction pack 39 is used to maintain control arm 30 in a selected position to act as a cruise control mechanism. Return arm 32 is also mounted on housing 24B and it interacts with ball bearing and bearing cap assembly 48 to return control arm 30 to a neutral position.

The term "neutral position" is generally used herein to denote the position where swash plate 13 is generally perpendicular to the pistons of pump 14, so that there is no output of IHT 10 and hence no rotation of axles 26. It will be understood by those of skill in the art, however, that the location of neutral may not be exact and the precision required in establishing neutral will depend on the application. In many applications there is a neutral band instead of a specific neutral point, and other features may be used to create the neutral position. Thus this term should not be read narrowly as only one specific point.

An IHT 10 such as is shown herein is generally configured in a manner opposite to that shown in these figures; i.e., it is configured for mounting in a vehicle such that the operator controls are towards the front of the unit, on the side opposite axles 26 and to the right in these figures. Such a configuration permits direct connection to control arm 30 from the vehicle speed control which is also typically on the right side of the vehicle. The brake control is typically on the left side of the vehicle and requires a cross-over linkage from the left side to the right side of the vehicle to reach brake mechanism 50. In one known configuration, the brake arm is actuated by a linkage attached to pull the return arm forward. Similarly, control arm 30 is set up so that movement in the forward direction corresponds to movement of swash plate 13 in a manner to provide forward rotation of axles 26, and movement of control arm 30 in reverse causes rotation of axles 36 in the vehicle reverse direction.

Figure 2:
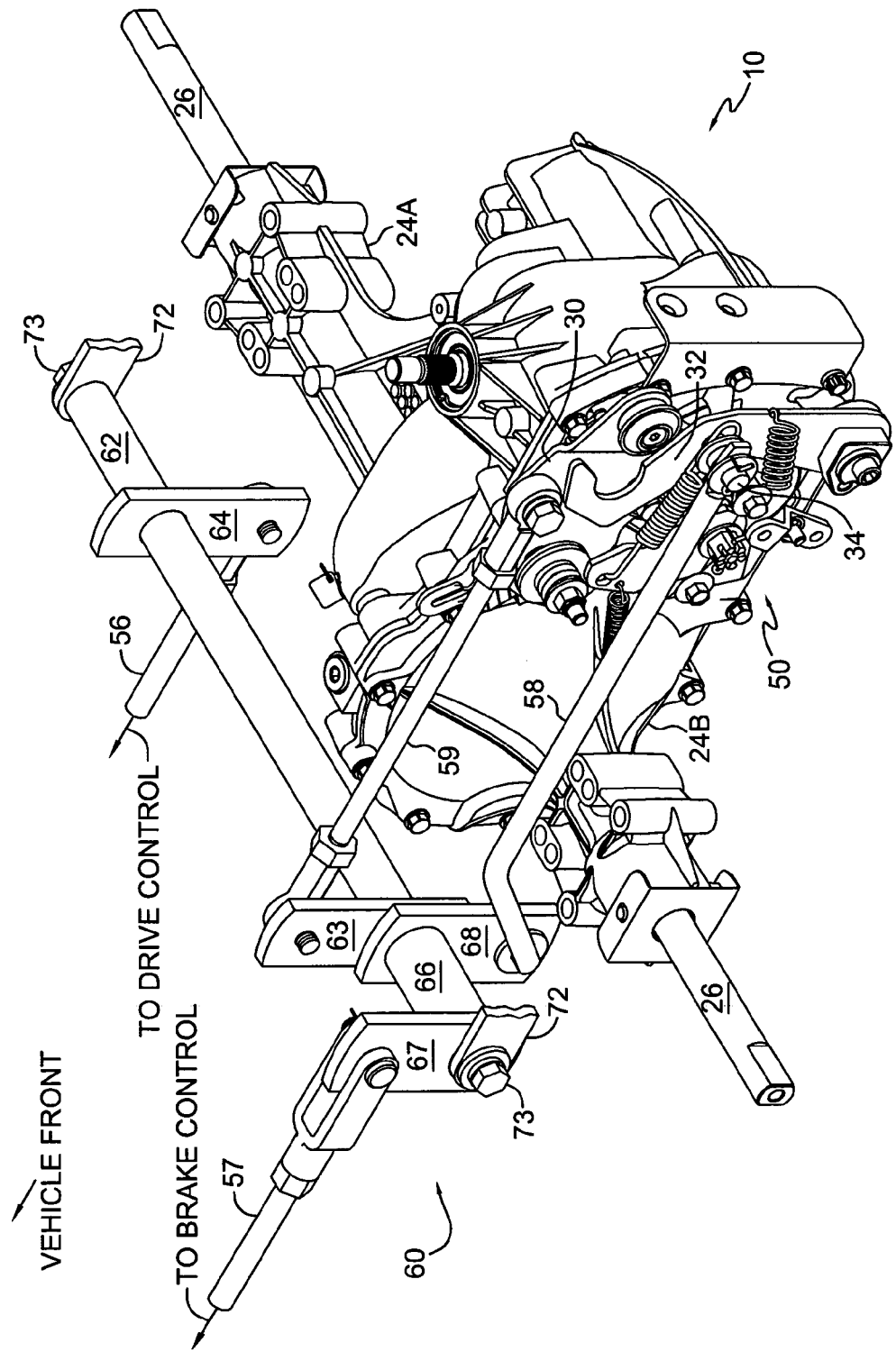
FIG. 2 is a perspective view of the transaxle and control assembly of the present invention.

It can be seen that if the orientation of IHT 10 in the vehicle is reversed to the configuration shown in FIG. 2, so that the axle shaft or shafts 26 are positioned between the IHT controls and the vehicle controls, then the direction the controls are actuated needs to be reversed, leading to a more complicated design for the linkages. The present invention, therefore, provides a simple control assembly that permits IHT 10 to be used with axle shafts 26 positioned between the IHT controls and the vehicle controls.

Note that while the aforementioned orientation of IHT 10 such as is shown in FIG. 2 is the primary and preferred use of this invention, one skilled in the art will recognize that the linkage assembly described herein may be repositioned by 180 degrees from the position shown in FIG. 2 to function with IHT 10 positioned in a typical position, i.e., with IHT 10 controls between axles 26 and vehicle controls, and the function of second crosslink 66 would change from the operating the return-to-neutral and brake to operating control arm 30, and the function of first crosslink 62 would change from operating control arm 30 to operating the return-to-neutral and brake.

Figure 3:
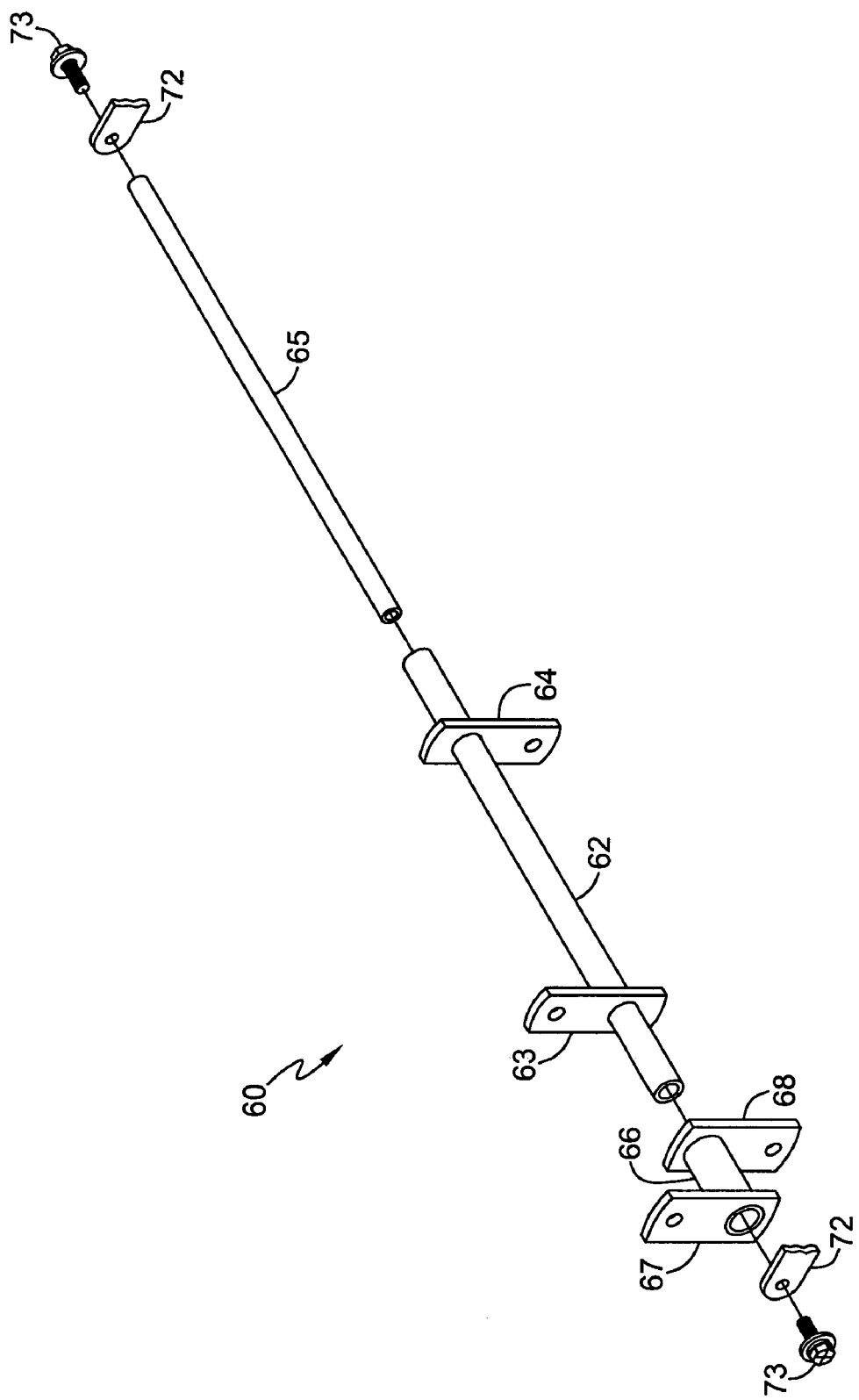
FIG. 3 is an exploded perspective view of the control assembly of the present invention.

The control assembly of the present invention can be seen most clearly in FIGS. 2 and 3. In FIG. 3, rod assembly 60 is depicted in an exploded view, showing an inner support rod 65 which acts to secure the entire assembly 60 between frame portions 72 through bolts 73. A first speed control crosslink 62 having opposing crosslink arms 63 and 64 extending therefrom is mounted on support rod 65. A second control crosslink 66 is rotatably mounted on one end of speed control crosslink 62 and it also has a pair of oppositely extending arms 67 and 68 at opposite ends thereof.

FIG. 2 shows rod assembly 60 as it would be assembled in connection with IHT 10. In the figures, various connection elements and other standard transaxle elements are not depicted for reasons of clarity. In addition, the connections described and shown herein are exemplary, as one of skill in the art would be aware of various different connection possibilities.

A first control linkage 56 is attached to crosslink arm 64 as shown. The opposite end of control linkage 56 would be connected to a vehicle drive control (not shown) such as a pedal, hand control or the like. The second control linkage 59 is secured on one end to second crosslink arm 63 and at its other end to control arm 30, so that rotation of control crosslink 66 provides direct control of swash plate 13.

Second control crosslink 66 rotates on one end of speed control crosslink 62. This provides for a more compact assembly than previously known, and it simplifies the assembly of the entire unit. Crosslink arm 67 is attached at the far end to brake control linkage 57, which is also connected at its opposite end to a vehicle control (not shown) such as a brake pedal or the like. Brake linkage 58 is connected at one end to crosslink arm 68 and at its opposite end to return arm 32, and specifically to stud 34 mounted on return arm 32. Spring 41 is also engaged to both stud 34 at one end and to brake arm 35 at the other end.

It would be understood that actuation of control linkage 56 will cause rotation of speed control crosslink 62 on support arm 65 and corresponding opposite movement of control linkage 59, due to the fact that arms 63 and 64 face in opposite directions. Similarly, actuation of brake control linkage 57 will cause rotation of second control crosslink 66 on crosslink 62 and corresponding opposite movement of brake linkage 58.

Figure 4:
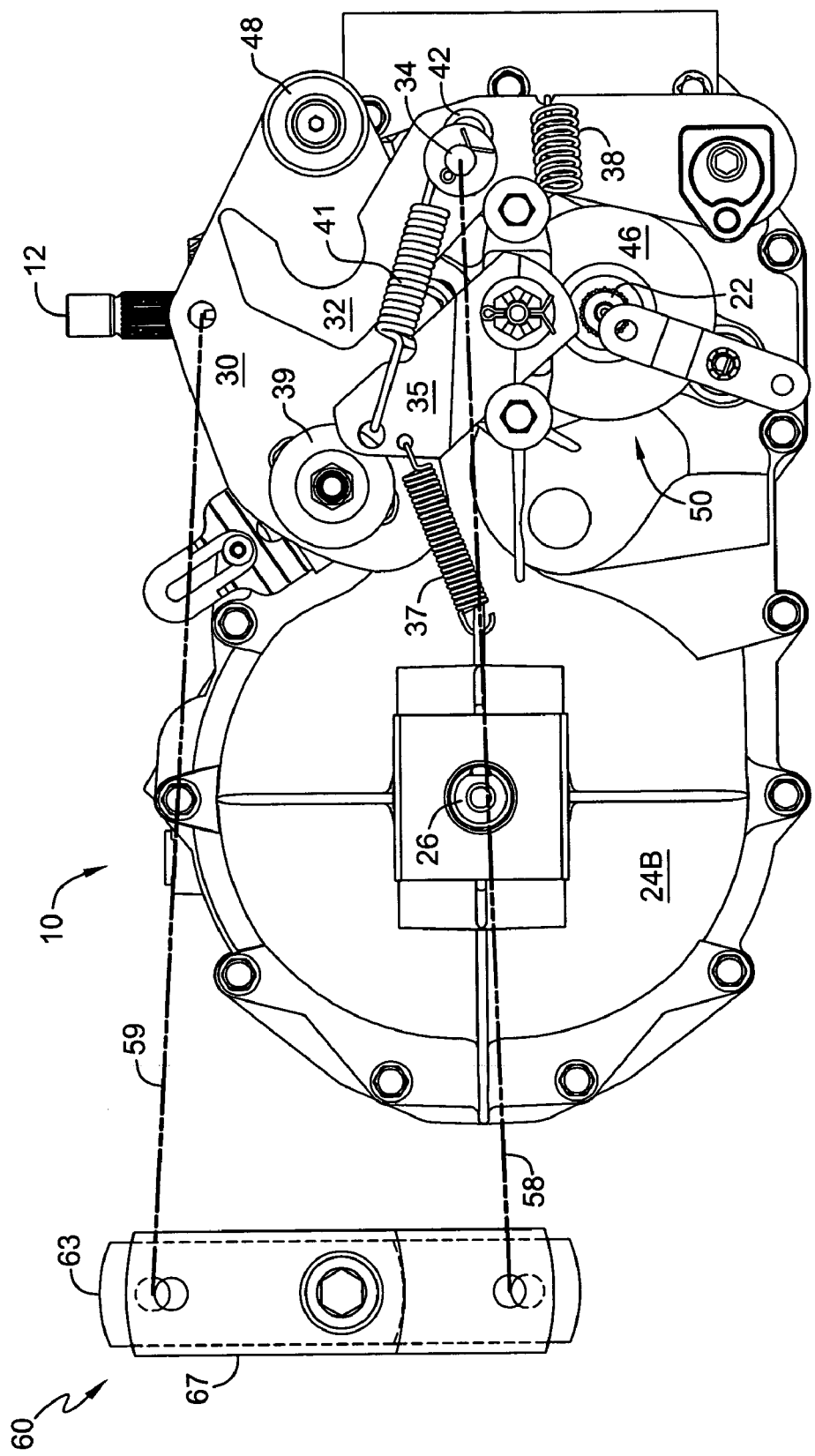
FIG. 4 is a side elevational view of the transmission and control assembly of the present invention shown as it would be mounted in a vehicle such as a lawn tractor, with the control arm in neutral and the return arm fully disengaged.
Figure 5:
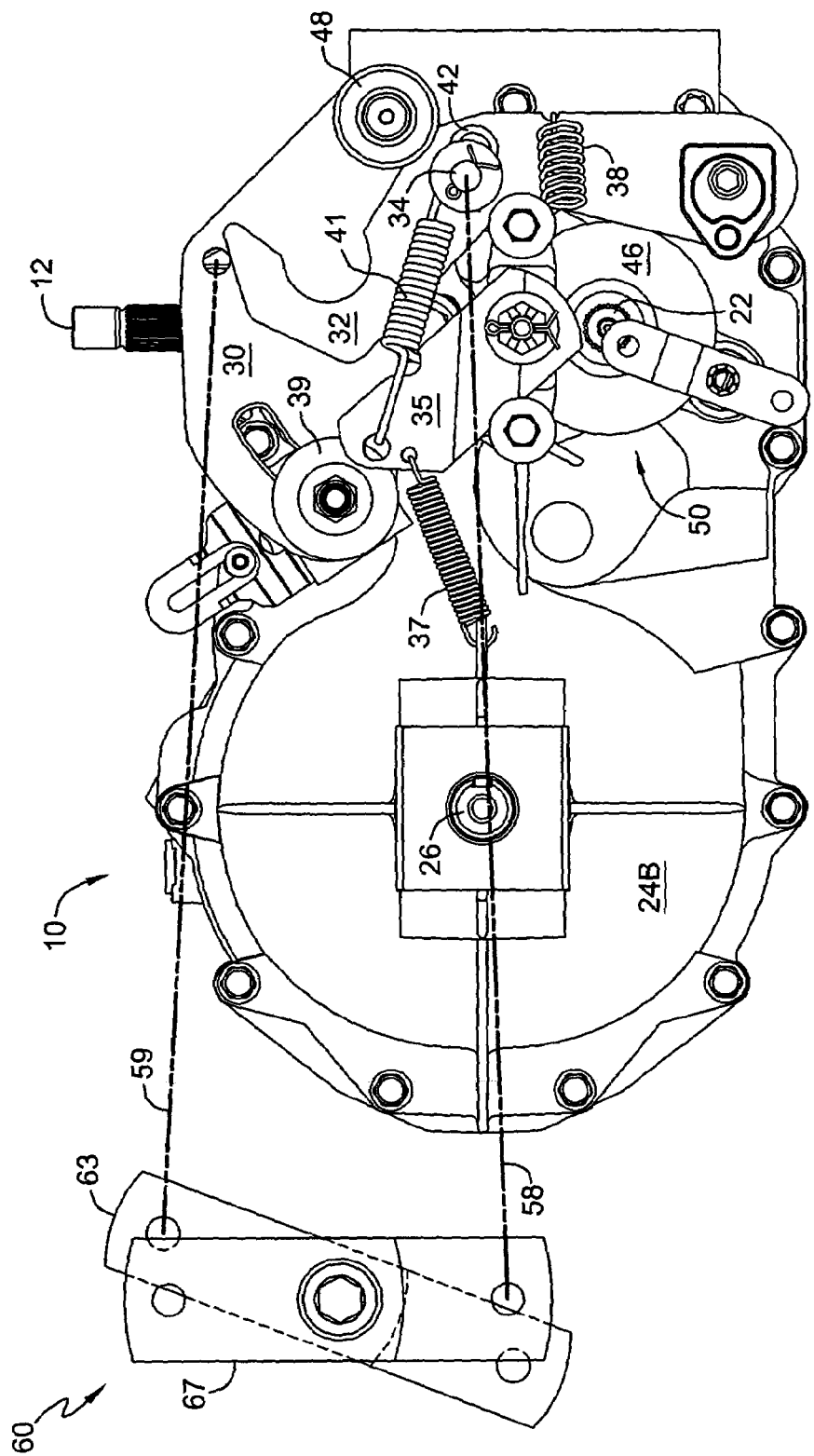
FIG. 5 is a side elevational view of the transmission and control assembly of FIG. 4, with the control mechanism in the forward position and the return arm fully disengaged.

The operation of control assembly 60 can be best seen by a comparison of FIGS. 4, 5, 6 and 7. For clarity, control linkages 58 and 59 are shown as dashed lines in these figures. In FIG. 4 crosslink arm 63 is in the "neutral" position, which would correspond to a neutral position for control arm 30, trunnion arm 25 and swash plate 13. In FIG. 5, on the other hand, crosslink arm 63 is in the "forward" position, and control linkage 59 has pushed control arm 30 to a forward position.

Figure 6:
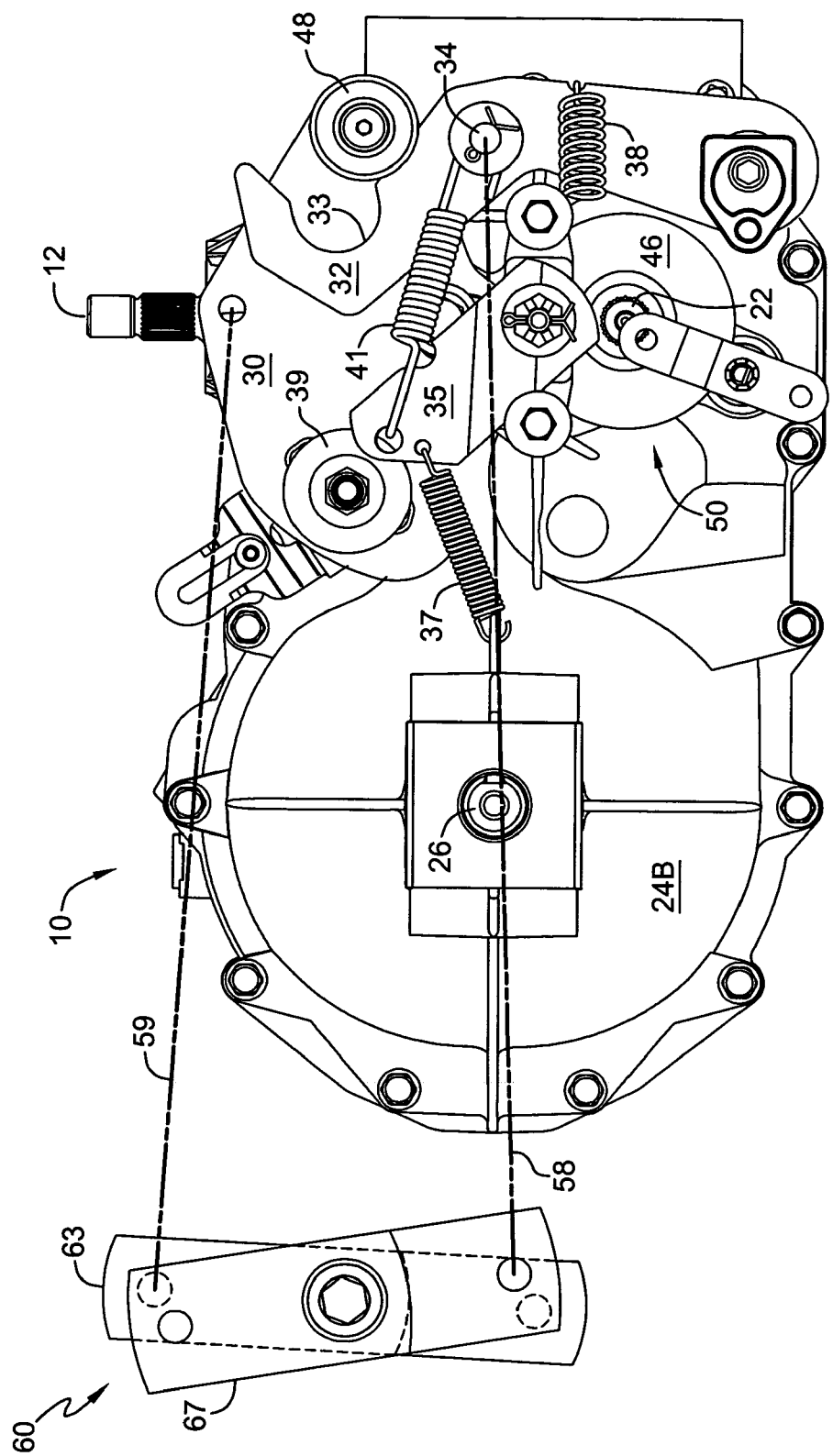
FIG. 6 is a side elevational view of the transmission and control assembly of FIG. 4, with the return arm having engaged the control arm bearing assembly and moved the control arm partially toward a neutral position, and the return arm has also moved to remove any slack with respect to the brake arm linkage spring.

Crosslink arm 67 is shown in the disengaged position in FIGS. 4 and 5, where return arm 32 is therefore also not engaged. In the disengaged position, return arm 32 has no function and has clearance with bearing assembly 48 and spring 41. The clearance with spring 41 is by means of an extended loop 42 formed in spring 41. In FIG. 6, the vehicle brake pedal or control has been partially engaged and thus crosslink arm 67 is moved counter-clockwise, pushing control linkage 58 and return arm 32. As control linkage 58 is engaged further, the slack in the system is removed such that return arm 32 contacts bearing assembly 48 and begins to force bearing assembly 48 toward pocket 33 formed in return arm 32. At the same time, as return arm 32 moves forward, the gap between stud 34 and extended loop 42 is eliminated as stud 34 contacts loop 42 and begins to apply force to spring 41.

Figure 7:
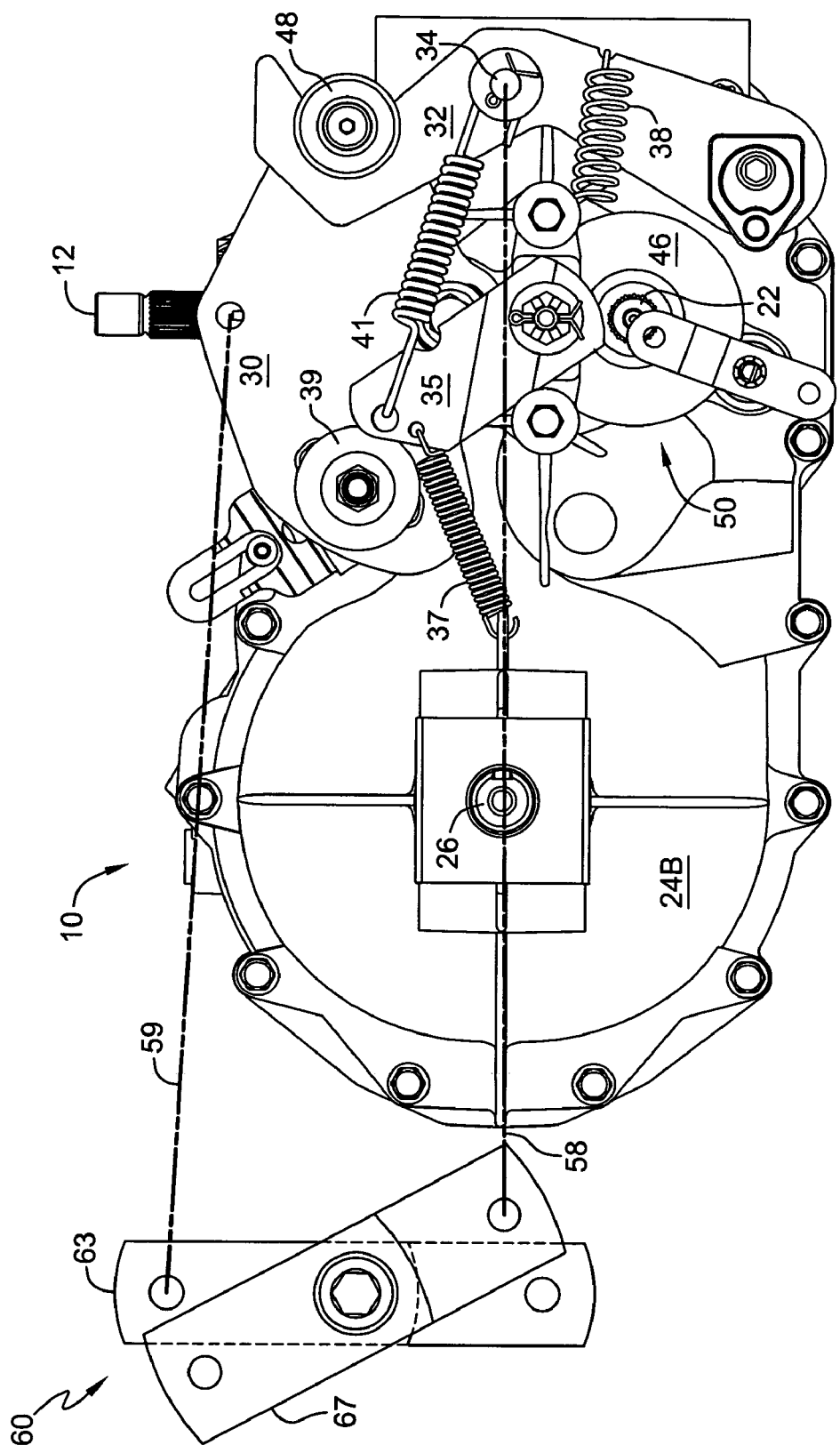
FIG. 7 is a side elevational external view of the transmission and control assembly of FIG. 4, where the return arm has moved the control arm to neutral and stretched the brake arm linkage spring to fully apply the brake.

As the brake pedal or control is fully applied, as shown in FIG. 7, return arm 32 is pushed to its extreme clockwise rotation position, and return arm 32 forces bearing assembly 48 on control arm 30 into pocket 33 to force control arm 30 to return to the neutral position. As control arm 30 moves into the neutral position, crosslink arm 63 is moved into a position associated with neutral by means of second control linkage 59, and will further move first control linkage 56 and other associated vehicle controls into a position associated with neutral.

Furthermore, as return arm 32 moves from the position shown in FIG. 6 to that shown in FIG. 7, the force applied to spring 41 actuates brake arm 35. Note also that return arm spring 38 and brake arm spring 37 also both stretch as return arm 32 moves into the position shown in FIG. 7.

It can thus be seen that assembly 60 acts not only as a speed control assembly, but also as a return-to-neutral and brake feature. The design of the unit allows the return to neutral force to be applied before the brake is fully engaged, providing for smoother operation.

When the force on brake control linkage 57 is removed, springs 37, 38 and 41, which may be augmented by other springs associated with assembly 60, act to position return arm 32, brake arm 35, and thus linkage 58, crosslink 66 and its associated crosslink arms 67 and 68, and brake control linkage 57 to the deactivated position shown in FIGS. 2 and 4. Not all of these features need to be included, however, to obtain the benefits of this invention.

A further benefit of this design is the symmetric nature of the two crosslinks 62 and 66. As can be seen most clearly in FIG. 3, arms 63 and 64 are mounted adjacent to and equidistant from opposite ends of crosslink 62. Similarly, arms 67 and 68 are mounted at opposite ends of crosslink 66. It is preferred that arms 63 and 64 be identical in appearance, and that arms 67 and 68 also be identical in appearance. Such a design assists in providing a more compact unit, but also provides for a simplified assembly. Specifically, the symmetric nature of the two crosslinks 62 and 66 prevents them from being installed in the unit in the wrong direction. As can be seen, crosslink 62 can be mounted on rod 65 in either direction, and arms 63 and 64 are interchangeable. Similarly, arms 67 and 68 are interchangeable, so crosslink 66 can be mounted on crosslink 62 in either direction. This eliminates the possibility of error in assembly and the delays inherent therein.

While specific embodiments of the invention have been described in detail, it will be appreciated by those skilled in the art that various modifications and alternatives to those details could be developed in light of the overall teachings of the disclosure. Accordingly, the particular arrangements of the return-to-neutral mechanism, dampening mechanism, brake mechanism, etc. disclosed are meant to be illustrative only and not limiting as to the scope of the invention which is to be given the full breadth of the appended claims and any equivalents thereof.

We claim:

1. A control mechanism for a hydrostatic transmission having a housing, a brake mechanism and a transmission control arm mounted on the housing, the control mechanism comprising:

a support rod;

a first linkage member rotatably mounted on the support rod and having first and second oppositely extending arms mounted thereon, where the first arm is operatively connected to a vehicle drive control and the second arm is operatively connected to the transmission control arm; and a second linkage member rotatably mounted on the first linkage member and having third and fourth oppositely extending arms mounted thereon, where the third arm is operatively connected to a vehicle brake control and the fourth arm is operatively connected to the brake mechanism.

2. A control mechanism as set forth in claim 1, further comprising:

a return arm mounted on the transmission housing and connected to the fourth linkage member arm;

a brake arm mounted on the transmission housing and operatively connected to engage the brake mechanism;

a first spring device having a first end connected to the return arm and a second end connected to the brake arm.

3. A control mechanism as set forth in claim 2, wherein the first spring device comprises an extended loop to engage the return arm, so that actuation of the second linkage member causes movement of the return arm before the first spring device provides force to the brake arm.

4. A control mechanism as set forth in claim 2, further comprising a second spring device having a first end mounted to the brake arm and a second end mounted to the transmission housing to provide a return force to the brake arm.

5. A control mechanism as set forth in claim 1, wherein the hydrostatic transmission comprises a rotatable pump driven by an input shaft and controlled by a movable swash plate, wherein the transmission control arm is operatively connected to the swash plate.

6. A control mechanism as set forth in claim 1, wherein the transmission comprises a hydrostatic transaxle having a pair of axles extending from the transmission housing, and the axles are located between the first and second linkage members and the transmission control arm.

7. A control mechanism for a transmission mounted in a vehicle having a drive control and a brake control, the control mechanism comprising:
 a first symmetric linkage member rotatably mounted with respect to the vehicle and comprising a first pair of arms mounted thereon and extending in opposite directions from one another; and
 a second symmetric linkage member rotatably mounted on the first symmetric linkage member and comprising a second pair of arms mounted thereon and extending in opposite directions from one another.

8. A control mechanism as set forth in claim 7, further comprising a support rod mounted at both ends thereof to a fame of the vehicle, and wherein the first symmetric linkage member is rotatably mounted on the support rod.

9. A control mechanism as set forth in claim 8, wherein the transmission comprises a pair of axles mounted in a housing, a transmission control arm mounted on the housing, and a brake arm mounted on the housing; and wherein the pair of axles is located between the transmission control arm and brake arm on the one hand and the vehicle drive and brake controls on the other hand.

10. An axle driving apparatus for a vehicle, comprising:
 a transmission mounted in a housing;
 at least one axle extending from the transmission housing;
 transmission controls mounted on the transmission housing and comprising a control arm and a brake arm;
 a brake activation control and drive control mounted on the vehicle; and
 a linkage assembly mounted on the vehicle, whereby the axle is located between the linkage assembly and the transmission controls, the linkage assembly comprising:
  a first linkage member rotatably mounted with respect to the vehicle and comprising a first pair of oppositely extending arms, wherein one of the first pair of arms is operatively connected to the vehicle drive control and the other of the first pair of arms is operatively connected to the control arm; and
  a second linkage member mounted to be rotatable with respect to the first linkage member and comprising a second pair of oppositely extending arms wherein one of the second pair of arms is operatively connected to the vehicle brake activation control and the other of the second pair of arms is operatively connected to the brake arm.

11. An axle driving apparatus as set forth in claim 10, wherein the second linkage member is rotatably mounted directly on the first linkage member.

12. An axle driving apparatus as set forth in claim 10, wherein the transmission comprises a hydrostatic transmission having a pump input shaft extending vertically from the transmission housing; and wherein the axle is located between the pump input shaft and the first and second linkage members.

13. An axle driving apparatus mounted in a vehicle comprising:
 a hydrostatic transmission having a drive control and a brake control;
 a return arm engaged to the transmission drive control; and
 a control mechanism engaged to the hydrostatic transmission and comprising a first linkage member engaged to the return arm, a second linkage member engaged to the drive control, and a spring device secured to the brake control and to the return arm in a manner so that movement of the first linkage member a first distance causes the return arm to move the drive control toward a neutral position without engaging the brake control, and further movement of the first linkage member causes the spring device to rotate the brake control.

14. The axle driving apparatus of claim 13, wherein the second linkage member is rotatably mounted on the first linkage member.

15. The axle driving apparatus of claim 13, further comprising a second spring device attached to the return arm and a third spring device attached to the brake control, where the second and third spring devices act to return the return arm and brake control to a deactivated position.

16. The axle driving apparatus of claim 13, wherein the first linkage member and second linkage member both have a pair of oppositely extending arms.

17. The axle driving apparatus of claim 16, wherein the oppositely extending arms on the first linkage are symmetrically located thereon.

18. The axle driving apparatus of claim 17, wherein the oppositely extending arms on the second linkage are symmetrically located thereon.

* * * * *

UNITED STATES PATENT AND TRADEMARK OFFICE
CERTIFICATE OF CORRECTION

| | | |
|---|---|---|
| PATENT NO. | : 6,923,092 B1 | |
| APPLICATION NO. | : 10/652759 | |
| DATED | : August 2, 2005 | |
| INVENTOR(S) | : Thomas Wiley and Bryce E. Steenburg | |

It is certified that error appears in the above-identified patent and that said Letters Patent is hereby corrected as shown below:

In Claim 8, Column 7, Line 21 replace "fame" with --frame--.

Signed and Sealed this
Second Day of October, 2012

David J. Kappos
*Director of the United States Patent and Trademark Office*